INVENTORS
ERNEST R. WATKINS, Jr.
BY DAVID W. BROWNE

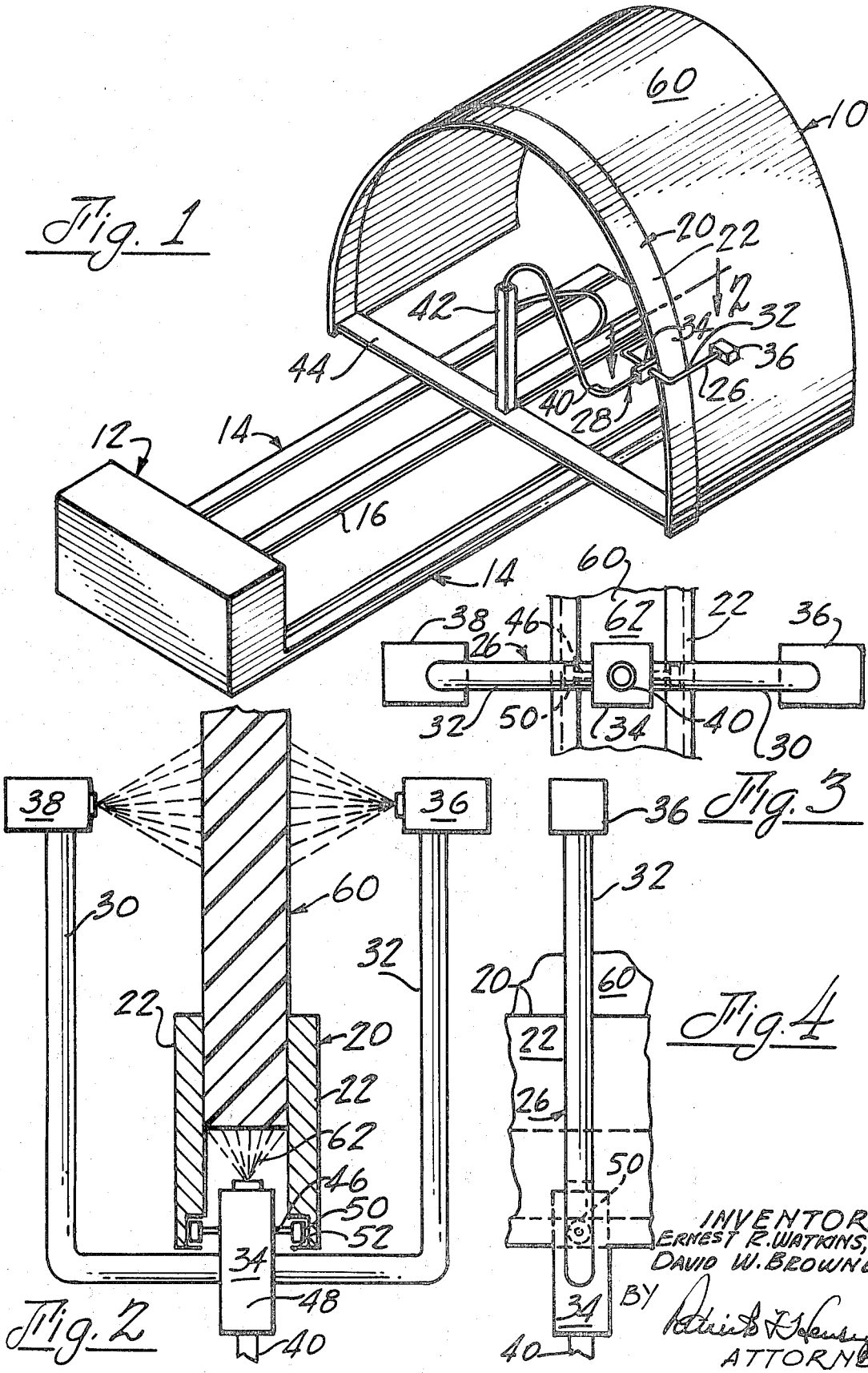

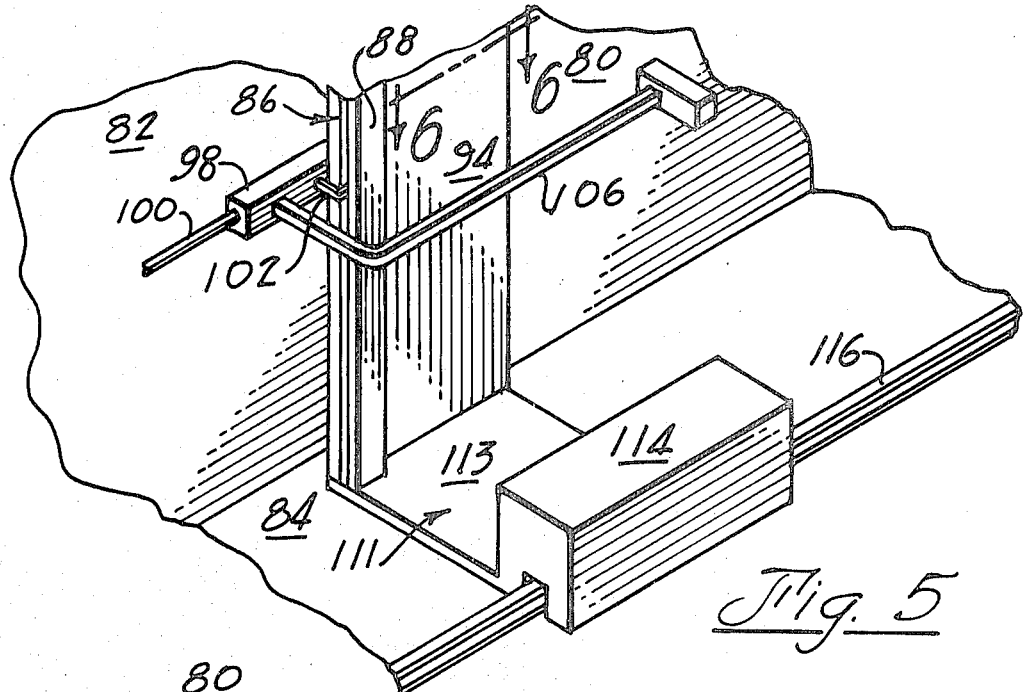

ATTORNEY

INVENTORS
ERNEST R. WATKINS, JR
BY DAVID W. BROWNE

ATTORNEY

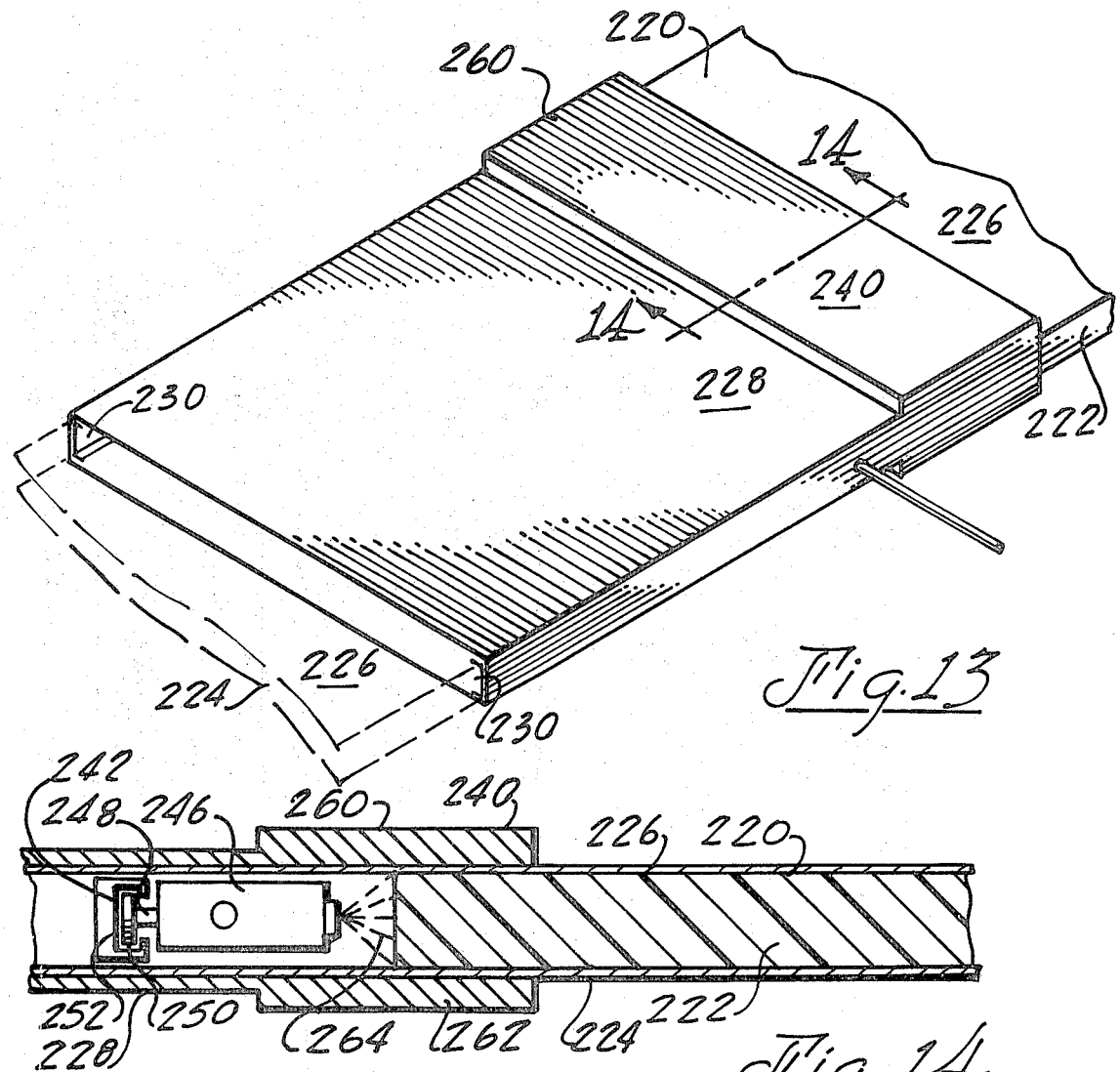
Fig. 13
Fig. 14
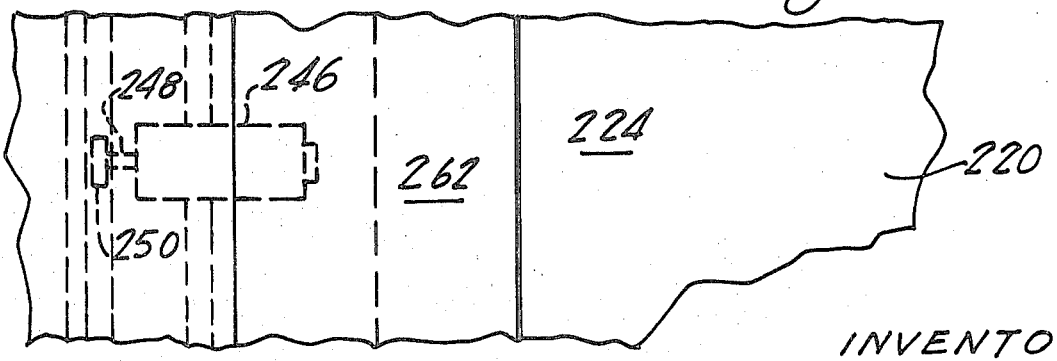
Fig. 15
INVENTORS
ERNEST R. WATKINS, JR.
DAVID W. BROWNE
BY
ATTORNEY

United States Patent Office 3,776,990
Patented Dec. 4, 1973

3,776,990
METHOD OF FORMING SOLID STRUCTURES FROM A CONTINUOUSLY SUPPLIED LIQUID
Ernest R. Watkins, Jr., P.O. Box 12091, Atlanta, Ga. 30305, and David W. Browne, P.O. Box 444, Snellville, Ga. 30278
Continuation of abandoned application Ser. No. 817,317, Apr. 18, 1969. This application Nov. 22, 1971, Ser. No. 200,812
Int. Cl. B28b 1/32
U.S. Cl. 264—54
10 Claims

ABSTRACT OF THE DISCLOSURE

A continuously moving foam spray nozzle which supplies liquid plastic such as polyurethane moves in a path to define and create a solid structure which solidifies immediately as the noozle moves away and the result can be a curved solid building structure similar to a conventional "Quonset hut" made from solid plastic or can be wall structures of different shapes. The foaming spray nozzle is carried on a guide frame which moves along a predetermined track and in the case of curved structures like a "Quonset hut" the foam nozzle moves in an arch from one side to the other and at the same time is moving lineally on the track to create a continuous curved shell of whatever length is desired. (Nozzles may be mounted facing each other in opposition to coat a shell formed there between by the foam which is applied from other means.) In another form, simultaneously with the creation of the plastic structure a covering of sheet plastic or other similar material is supplied from rolls carried with the nozzle, whereby the exterior surfaces both outside and inside may be simultaneously covered with sheet plastic or other similar material which adheres to the foam. With the nozzle operating from side to side and simultaneously moving lineally, wall panels may be created continuously and simultaneously covered with a skin of plastic or other similar material. According to the method of the present invention, the material used must be self-supporting in atmosphere (e.g. plastic foam) so as to remain in place and resist dripping by gravity until it has solidified sufficiently to form a solid structure. The method is that of continuously supplying a foam material and continuously moving said supply in a pre-determined pattern to create a three-dimensional structure by moving said supply both lineally and in a direction either straight or curved transverse thereto.

This application is a continuation of Ser. No. 817,317, filed Apr. 18, 1969, now abandoned.

BACKGROUND OF THE INVENTION (1) Field of the invention

The field of the invention should include building structures and especially those formed from spray material. Plastic foaming could also be considered along with continuous extrusion of structural members.

(2) Description of the prior art

It is well known in the art to create a mold for building structure and then form the structure from poured material such as concrete or compounds of concrete. This requires the building of a complete support frame or mold which is essentially complementary to the final result and must be substantially the same size and shape and usually has to include a partial inner and outer mold shell. Such structures are expensive and require a great deal of space. It is also well known in the art to fill voids, such as found in boats and refrigeration spaces, by means of polyurethane or polyethelene or other types of solid plastic material delivered in a liquid state by means of foam. Foam plastic compounds are well known and have many uses in present day life, including insulation as well as packaging and reinforcement. Among the problems of the prior art is that of having the foam materials stick to the mold shell and the difficulty, time and expense involved in either preparing the old shell, such as metal or plywood, so that there will be no sticking or in removing the mold shell after the foam material is poured. According to the present invention there is no mold shell for the entire structure but only a small supporting section which supports the moving mold nozzles that create the continuous section without the use of inner or outer shells and the structure so created becomes its own support and the depository for additional foam upon solidifying.

The following references could be considered part of the prior art: 2,877,530; 2,979,798; 3,016,595; 3,206,899; 3,303,617; 2,435,052.

SUMMARY OF THE INVENTION

In apparatus for forming a structure, such as a straight or curved wall, continuously from a plastic material that is delivered from a liquid form that has not solidified: a retainer frame, a plastic delivery means mounted on said retainer frame for continuous movement thereon corresponding to one direction of the structures to be formed, support means for said retainer means on which said retainer means is moved in the direction corresponding to the other direction of the said structures to be formed, and means for continuous delivery of chemicals to said nozzle for creating a plastic structure continuously as said nozzle is moved in two directions.

In a method for forming a structure, such as a curved or straight wall: supporting a delivery means such as a nozzle for foam plastic to which is continuously supplied a chemical that is delivered in a non-solidified state to become solidified immediately after delivery, moving said delivery means continuously in one direction (representing one direction of the structure to be formed) and simultaneously therewith continuously moving said delivery means in another direction representing the other dimension of the structure to be formed whereby the non-solidified material is delivered to the atmosphere and substantially immediately solidified forming a solid structure of polyurethane plastic or the like which is self-supporting and to which additional solidified material is continuously added to continuously extend the direction of said structure as said delivery means is moved in both directions.

A BRIEF DESCRIPTION OF THE DRAWING

The drawings include the presentation of more than one embodiment of the present invention.

FIG. 1 is a perspective, diagrammatic view of one form of the present invention for making a curved shell structure.

FIG. 2 is a cross-sectional view taken substantially along lines 2—2 in FIG. 1.

FIG. 3 is a front elevation view looking at the foam nozzles.

FIG. 4 is a side elevation view of the foam nozzles.

FIG. 5 is a perspective, diagrammatic view of an alternative form of the invention arranged to make straight wall sections.

FIG. 6 is a diagrammatic, cross-sectional view along line 6—6 of a modified form of the invention shown in FIG. 5.

FIG. 7 is a side-elevation view of the diagrammatic view shown in FIG. 6.

FIG. 13 is a diagrammatic, perspective view of a single nozzle embodiment, for making flat wall sections covered with plastic panels.

FIG. 14 is a cross-sectional view of the embodiment shown in FIG. 13 taken along lines 14—14, therein.

FIG. 15 is a side elevation view of a portion of the embodiment shown in FIG. 13.

DESCRIPTION OF THE FIRST PREFERRED EMBODIMENT

Figure 8:
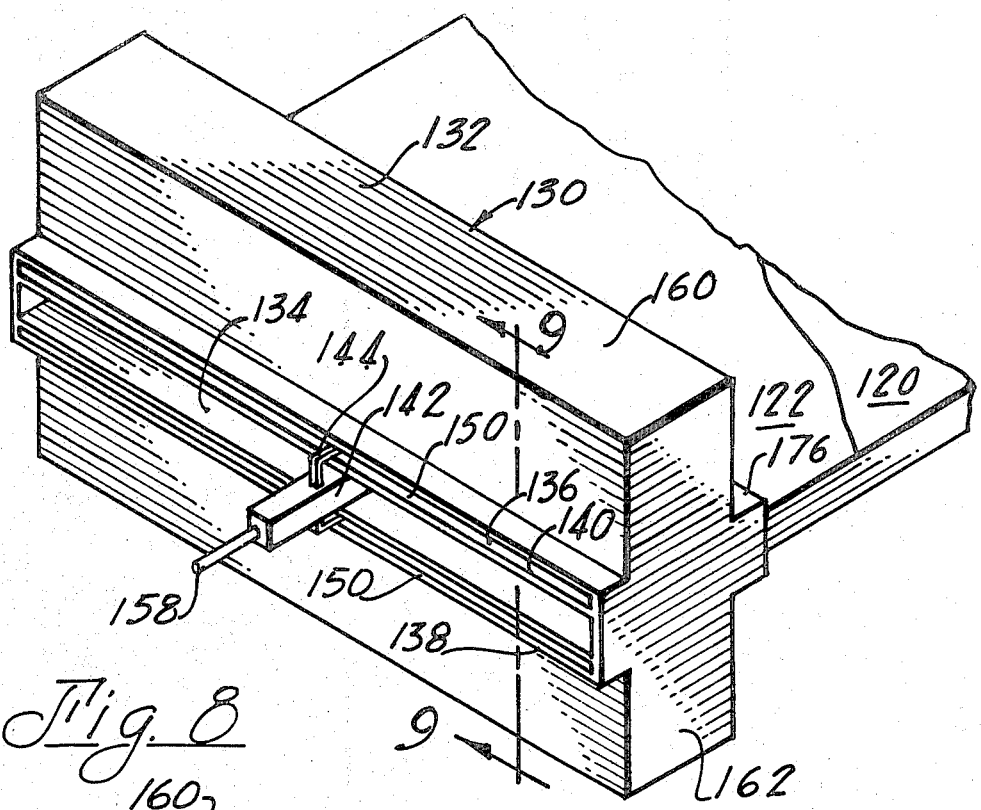
FIG. 8 is diagrammatic, perspective view of still another embodiment of the present invention illustrating another way of making flat wall section, with plastic skins thereon.

As mentioned previously, solid plastic material such as polyurethane and polyethylene foam are well known and the raw materials are obtainable on the open market from a number of well-known chemical companies. These chemicals usually consist of the polymer or similar chemical for a catalyst which when mixed together in the presence of air, solidify into a cellular foam structure. The present invention will work with any foam material which solidifies after mixing either in the presence of atmosphere, heat or other environmental conditions. A requirement is that the material can be supplied and emitted from a source outlet such as a nozzle in a semi-solid or foam state or having the characteristic of being sufficiently self-supporting to resist gravity long enough to solidify substantially immediately after emission. The many foam polyurethane and polyethylene plastics satisfy this requirement. Thus, any material which can be delivered to and from an outlet and which thereafter will solidify can be used with the present invention.

In FIG. 1 the entire apparatus is designated generally by reference numeral 10 and comprises the metering and pumping control unit designated generally by reference numeral 12 and in which there would be found conventional equipment such as a motor and pump (not shown) for pumping the plastic foam chemicals. The metering and pumping control unit 12 is mounted with a longitudinal guide means 14 comprising track members 16 which may be constructed from rails of metal and the like. The guide means 14 serves as a platform on which is mounted a temporary mold comprising a support means designated generally by reference numeral 20 and having a pair of continuous retainer walls 22 spaced from each other to provide the area in which the structure is formed and also acting as a means for supporting the traveling delivery means designated generally by reference numeral 26 for the chemical liquid such as polyurethane materials which in the embodiment of FIG. 1 comprises a conduit frame 28 having coating branches 30, 32 leading to spaced opposed coating nozzles 36, 38 each of which has a respective hose inside branches 30, 32 and an emission opening therein from which the plastic coating spray is emitted after being pumped through the respective hoses in branches 30, 32, which are supplied by means of a multiple hose arrangement 40 leading to a hose support stand 42 mounted on a frame member 44 resting on the platform created by the track members 16. Multiple hose arrangement 40 has individual passages supplying respectively plastic coating nozzles 36, 38, foam and catalyst selectively to nozzle 34, and selectively air or other fluid when needed by means of coaxial hoses or other separate passageways. The conduit frame 28 is supported for movement on the retainer walls 22 by means of shafts 46 attached to the opposite sides of nozzle housing 48 of nozzle 34 and to which shafts are mounted respective wheels 50 that may resemble small skate wheels, each of which travels in a groove or slot 52, in a respective position on a respective retainer wall 22, as seen in FIG. 2. The entire conduit frame 28 and therefore the nozzles 34, 36, and 38 are moved manually while the plastic foam spray is being pumped to and emitted from the respective nozzle 34, and plastic coating is being sprayed by 36, 38; and at the same time the entire frame 20 is moved manually along the tracks 16 and as seen in FIG. 2 the structure designated generally by reference numeral 60 is continuously being formed between the proposed retainer walls 22, by means of the foam plastic emitting from nozzle 34 which continuously moves around the walls 22 foaming on the continuously formed edge of the edge 62 of the structure 60 and at the same time moving longitudinally in the other direction making a continuous structure 60 in the form of a "Quonset hut" in FIG. 1.

EMBODIMENT IN FIGS. 5, 6, 7

Referring to FIG. 5 it is seen that a flat structural panel designated generally by reference numeral 80 is being formed against a fixed, flat wall surface 82 which could be a wall supported on the floor 84 and acting as one side of the mold cavity. A mold frame designated generally by reference 86 comprises a vertical frame member 88 having a track 90 therein and comprising a short, vertical retainer wall 94, which acts as the other side of the temporary, short mold with the wall 82. The foaming nozzle 98 supplied by hose 100 is mounted on a shaft 102 and travels by means of a small skate wheel 104 mounted in a slot or track 90 on the retainer wall plate member 94. Carried with the nozzle 98 for movement is a conduit 106 supplying a coating spray nozzle head 108 having an opening 110 from which is sprayed a suitable coating material 112 that is being continuously applied to the wall structure 82 which has just been formed so as to provide an exterior coating thereon. This embodiment permits the continuous construction of a flat wall section such as might be used for interior wall panels or as veneer for other wall panels. The frame 86 is mounted on a support 111 comprising a metal plate 113 on which is mounted the metering and pumping control unit 114 which is supported on a guide track 116 on which the unit 114 together with the support 111 and the frame 86 travels longitudinally simultaneously with the vertical movement of the foam mix head 98 providing simultaneus movement in two directions, one of which is the creation of the structure by foaming the edge already formed at the same time moving in the other direction after the proper height of the edge has been formed. The movement can be controlled manually since the equipment is light enough to be manipulated.

EMBODIMENT IN FIGS. 8 AND 9

Figure 9:
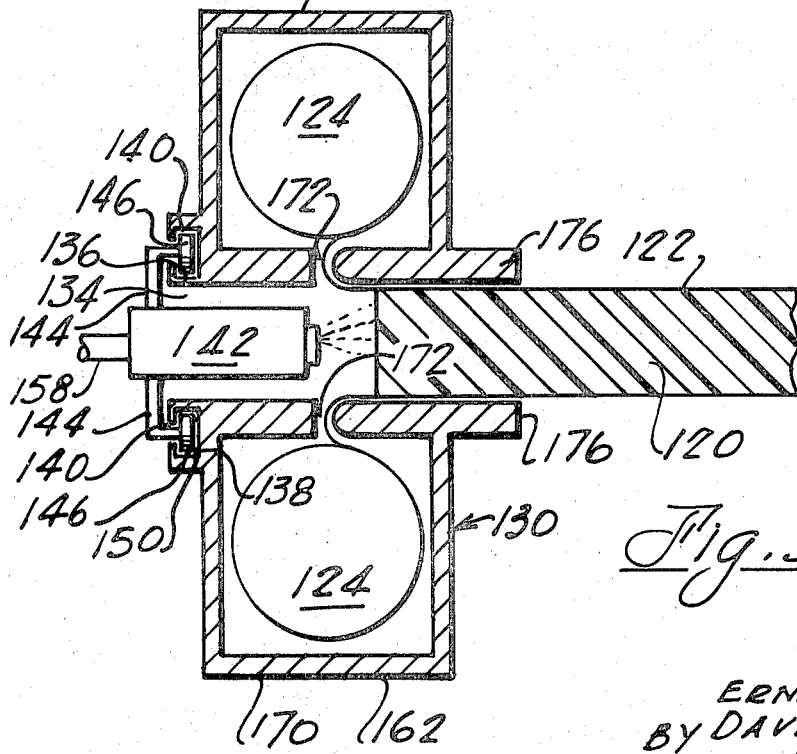
FIG. 9 is a diagrammatic, cross-sectional view of the form of the invention taken along lines 9—9 in FIG. 8.

FIGS. 8 and 9 illustrate a form of the invention which may be used to create flat wall panels similar to that form in FIGS. 5, 6, 7 except that instead of spraying the surface with a coating material for one side the embodiment of FIGS. 8 and 9 provide most surfaces of the continuous reform structure 120 with a sheet plastic surface 122 delivered from respective rolls 124 of sheet material such as "kraft" paper or aluminum foil of whatever gauge thickness of material is required. The material 122 may be decorative in nature and could even be fabric or other coverings. The apparatus is designated generally by reference numeral 130 and comprises a housing 132 which may be constructed from frame members and metal plate leaving a transverse slot or opening 134 on opposite sides which is mounted respective tracks 136, 138, each having a slot 140 therein. The foam mix head 142 is mounted on respective shafts 144 each having a small skate wheel 146 supported in a track formed as a slot 150 in each of the track members 136, 138. The nozzle as in the case of the previous embodiments is fed by means of a hose 158 and supplied with the material which may be polyurethane foam chemical. The rolls 124 of the skin material which may be "kraft" paper or aluminum foil are mounted in the opposite sides of the housing 132 in compartments 160, 162 formed therein by means of plates 170, and the material 122 is fed from the rolls through respective slots 172 and directed between the structure 120 and the respective mold walls 176 attached as part of the tracks 136, 138.

EMBODIMENT OF FIGS. 10, 11, AND 12

Figure 10:
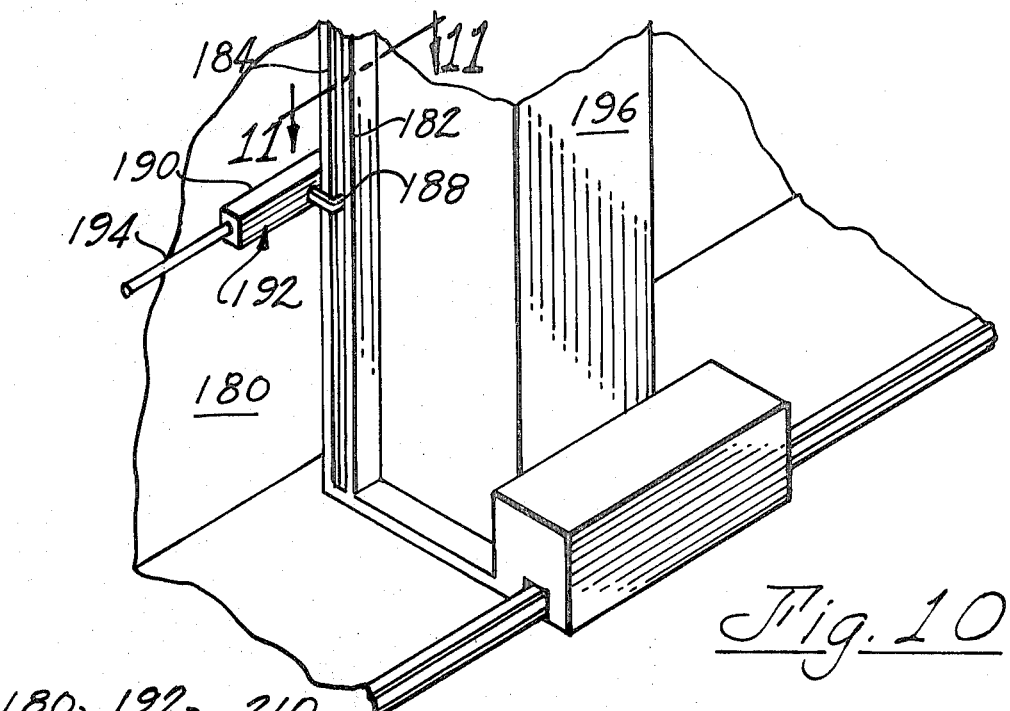
FIG. 10 is a diagrammatic, perspective view of a modified form of making the wall section against a solid surface (e.g. insulation or decoration) and a row of skin material.
Figure 11:
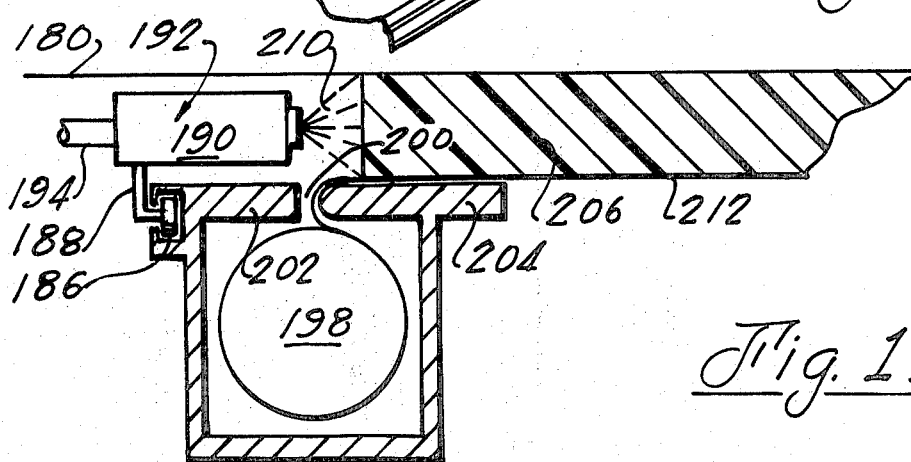
FIG. 11 is a cross-sectional view along lines 11—11 in the form shown in FIG. 10.
Figure 12:
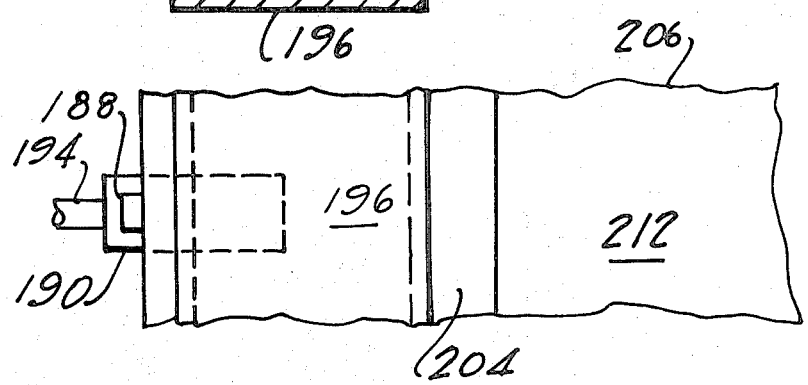
FIG. 12 is a side elevation view of the form shown in FIG. 11.

The embodiment of FIGS. 10, 11 and 12 is in a sense a combination of the embodiment shown in FIG. 5 together with a means for providing a skin or covering similar to that shown in FIG. 8 except for one side only. A continuous wall of solid surface 180 may be a metal plate like that shown in FIG. 7 next to which is supported the vertical support 182 and having the drive track 184 therein, in which is mounted a small skate wheel 186 on shaft 188 attached to the nozzle housing 190 of nozzle 192 which is supplied by a hose 194. A housing 196 has a role of skin material 198 therein which is fed through a slot 200 in the wall 202 and next to the whole wall 204 between it and the structure 206 formed by the emission of foam material 210 from nozzle 192. The skin or covering material 212 is applied to the surface of the structure 206 immediately before its formation and it becomes adhered to the foam surface thereof. As in the previous embodiment the foam bead 192 and the other structure may be moxed and manipulated by hand.

EMBODIMENTS OF FIGS. 13, 14 AND 15

In the embodiment of FIGS. 13, 14 and 15 the structure 220 is a combination of rigid panels such as light-weight plywood or other veneer between which is created the foam structure 222 to make a sandwich material. A pair of solid, thin, flat sheets 224, 226 are fed into a housing 228 constructed from spaced members 230 covered by light-weight metal plate or the like creating a small box in which the flat sheets are inserted through the foaming unit housing 240 in which is mounted a track 242 supporting a nozzle assembly 246 mounted on a shaft 248 and traveling on a skate wheel 250 in a slot 252 in the track 242. The short, temporary mold for the final structure 220 comprises opposed walls 260, 262 attached inside the housing 240 and in which travels the nozzle 246 spraying the foam material 264 continuously along the edge of the foam structure 222 as it is being formed. Simultaneously, therewith the rigid sheet 224, 226 are moved through the housing 240 continuously with the creation of the inner core 222.

Foam nozzles and equipment can be obtained from Gusmer Coatings, Inc., Woodbridge, N.J., or Binks Manufacturing Company, Chicago, Ill.

For starting the process, since there is initially no surface to foam against, a temporary plug, membrane or the like is supported between the retainer walls opposite the end of the spray nozzle. This plug or the like is stationary so that as the retainer walls move, it stays stationary holding the newly formed unit. After the unit starts, the plug is removed.

It should be noted that the pressure generated by the expansion of the material being delivered is not confined and is able to relieve itself in the direction from which the material is delivered. This is to be contrasted with the production of foam plastic material confined in walls or molds which has tremendous pressures and must be handled accordingly.

What is claimed is:
1. A method of constructing a horizontally disposed panel-like structure which has top and bottom surfaces, length and width, comprising:
   moving a plastic foam dispensing means linearly transversly across a horizontal support means for the structure being formed to the limit in one dimension of the length or width being formed in a horizontal direction and depositing a portion of foam material which solidifies along the horizontal direction which is being formed,
   returning said foam depositing means in the other direction of said dimension being formed and repeating the movement of said dispensing means to deposit in a horizontal direction additional and successive vertical portions attached to and against the vertical wall of portions previously formed,
   causing relative motion betwen said dispensing means and said structure as successive portions are formed so that there is a place for a respective layer and the foam deposited each time said dispensing means deposits a portion against the layer previously formed.
2. The method in claim 1:
   defining at least one surface positioned adjacent said dispenser means, said surface defining a space in a confined zone into which said form is dispensed,
   permitting said foam to expand in said space and to solidify while in said confined zone.
3. The method of claim 1 wherein said liquid material is polyurethane foam forming material.
4. The method of claim 1 wherein said dispenser means comprises a spray nozzle and said confined zone is defined by a pair of opposed plate members, said plate members being positioned parallel to said one direction with said nozzle spraying between them.
5. The method of claim 1 said material being discharged directly against the plastic material formed in that dimension on the previous discharge.
6. The method in claim 1:
   providing a stream of liquid material in one direction of movement representing one dimension of the structure and permitting that stream to solidify into a solid plastic being one dimension of the structure,
   continuing to provide a stream of liquid material against the solidified plastic previously formed by discharging said liquid material into an open space defined by spaced means while moving said structure in the direction opposite to the direction of the movement of the stream of material,
   permitting said discharged liquid material to expand in said open space sufficiently to solidify into a solid plastic attached to said previously formed plastic thereby creating a continuous solid structure in the direction of movement.
7. The method of claim 6 discharging said liquid material directly against the material previously formed in providing said stream of material.
8. The method in claim 7 discharging said liquid perpendicular against said material previously formed by permitting said liquid material to expand in the space forming an edge of said material in said space.
9. The method in claim 6 wherein said liquid material is polyurethane foam material.
10. The method in claim 1 wherein said stream of liquid material is supplied from a dispenser means and said spaced means comprises a pair of opposed plate members positioned parallel and extending in the direction of movement representing one dimension of the structure.

References Cited
UNITED STATES PATENTS

| | | | |
|---|---|---|---|
| 2,498,325 | 2/1950 | Zemanek et al. | 264—308 |
| 3,137,908 | 6/1964 | Winn | 425—60 X |
| 3,443,276 | 5/1969 | Smith et al. | 425—4 |
| 3,046,177 | 7/1962 | Hankins | 425—110 X |
| 3,417,429 | 12/1968 | Wright | 425—4 |
| 3,548,453 | 12/1970 | Garis | 425—4 |

H. A. KILBY, JR., Assistant Examiner

U.S. Cl. X.R.

52—88, 745, 749; 264—46, 308, 309; 425—4 C, 60, 63